United States Patent [19]

Musil

[11] 4,424,463
[45] Jan. 3, 1984

[54] APPARATUS FOR MINIMIZING MAGNETIC COGGING IN AN ELECTRICAL MACHINE

[76] Inventor: J. Donald Musil, 905 Top-O-Hollow Rd., Ames, Iowa 50010

[21] Appl. No.: 267,526

[22] Filed: May 27, 1981

[51] Int. Cl.$^3$ .............................................. H02K 3/16
[52] U.S. Cl. .................... 310/49 R; 310/186
[58] Field of Search ................... 310/49 R, 152, 154, 310/181, 186, 188, 254, 67, 106, 49, 156, 51, 4, 183; 318/138, 254, 638

[56] References Cited

U.S. PATENT DOCUMENTS

| | | | |
|---|---|---|---|
| 3,604,961 | 2/1970 | Saldinger | 310/51 |
| 3,860,843 | 1/1975 | Kawasaki et al. | 310/67 |
| 4,234,808 | 11/1980 | Geppert et al. | 310/49 R |
| 4,315,171 | 2/1982 | Schaeffer | 310/49 R |
| 4,347,457 | 8/1982 | Sakamoto | 310/256 |

Primary Examiner—J. D. Miller
Assistant Examiner—D. S. Rebsch
Attorney, Agent, or Firm—Zarley, McKee, Thomte, Voorhees & Sease

[57] ABSTRACT

An apparatus which reduces magnetic cogging between a rotor and stator of an electrical motor or generator. The stator is divided into pairs of angular pie-shaped segments, one member of each pair being shifted angularly with respect to the other member of the pair a distance equal to one-half of one pole pitch. This places the teeth of a shifted stator segment between the alternating magnetic poles of the rotor while the teeth of the unshifted segment are directly opposite the poles. When the rotor is moved, the reluctance torque, or magnetic cogging due to one member of a pair, virtually cancels the reluctance torque of the other member of the pair.

38 Claims, 12 Drawing Figures

APPARATUS FOR MINIMIZING MAGNETIC COGGING IN AN ELECTRICAL MACHINE

BACKGROUND OF THE INVENTION

Traditional electric motors or generators of this mode provide an annular rotor with alternating magnetic poles which are equally spaced around the rotor's internal circumference. Similarly, a disc-shaped stator which is concentrically spaced within the rotor, contains teeth of a magnetic material which are equally spaced around its external circumference. The symmetrical disposition of the stator's teeth causes a reluctance torque or magnetic cogging to occur between the teeth and the poles of the motor or generator. This cogging is due to the fact that when a pole is in a position other than directly opposite a tooth (i.e., stable equilibrium) or other than directly centered between teeth (i.e., an unstable equilibrium position), it is necessarily closer to one tooth than another, and thus is in a position of magnetic inequilibrium. The pole will thus be drawn from its position of inequilibrium to the closest tooth. When the pole is drawn from a position of stable equilibrium in either direction of rotation, magnetic cogging or reluctance torque seeking to return the pole to its minimum reluctance position directly opposite a tooth results.

Cogging is most noticeable when one initiates motion of the rotor, but it is present and does affect the operation of the motor or generator during a substantial portion of each cycle. Reduction of magnetic cogging is desirable because the less the force opposing rotation of the rotor, the more efficient the electrical machine will be. It will also provide a smoother, quieter running machine.

U.S. Pat. No. 4,110,441, issued July 11, 1978, attempts to cancel a portion of the "magnetic lock" by positioning diamagnetic materials between the drive motor magnets and permanent magnets in a magnetic transmission. The diamagnetic material screens the magnetic poles of the transmission from one another. In order for the transmission to function, however, the diamagnetic material cannot completely block the permanent magnets from the drive magnets. Thus, the cancelling effect occurs only during a portion of the rotational cycle of the transmission. Further, a substantial reduction in the magnetic flux (and therefore the overall efficiency of the transmission) occurs due to the screening diamagnetic material.

U.S. Pat. No. 4,469,133, issued Sept. 23, 1969, discloses use of asymmetrically shaped teeth, and providing a different width between the teeth of the rotor than that of the stator, as methods which would provide a relatively constant value for the total torque of an energized electrical machine. However, magnetic cogging is not minimized by the various arrangements.

Accordingly, it is a principal object of the present invention to provide an electrical machine which minimizes magnetic cogging during an entire cycle of operation.

It is a further object of the present invention to minimize magnetic cogging in an electrical machine without substantially reducing magnetic flux between a rotor and stator.

It is a further object of the present invention to minimize magnetic cogging of an electrical machine without introducing additional materials or elements to the conventional structures.

SUMMARY OF THE INVENTION

An annular rotor is placed in spaced concentric relation to a cylindrical stator of an electrical motor or generator. An even number of equally spaced magnetic poles, alternating in polarity, are connected to the internal circumference of the rotor. The stator has a plurality of equally spaced teeth around its periphery which are composed of a magnetic material. The stator is divided into an even number of angular, pie-shaped sections, which are matched in pairs. One member of each pair is displaced angularly relative to the other members, such that the magnetic force between the teeth of one member of each pair and the poles nearest thereto, is opposed by the same magneetic force between the teeth of the other member of the pair and the poles nearest thereto.

Additionally, each pair of sections is angularly displaced relative to the other pair, so that the magnetic flux between the teeth and poles is cut during rotation of the stator by the pairs of sections at different times. This provides multiphase output for a generator, or conversely, synchronous operation of a motor.

Alternate embodiments utilizing selected displacements of portions of the stator are presented. In one alternate embodiment, the stator is comprised of six discs stacked on each other with a common central axis. The discs are again identified as pairs with one member of each pair shifted with respect to the other member, to reduce magnetic cogging. In another embodiment, the poles and the teeth are wedge shaped. The poles are circularly disposed with equal spacing and face a circular disposition of the teeth. Selected tooth sections are again shifted circumferentially to minimize magnetic cogging.

DESCRIPTION OF THE PREFERRED EMBODIMENT

The included preferred embodiment is given by way of example only, and not by way of limitation to the invention, which is solely described by the claims herein. Variations obvious to one skilled in the art will be included within the invention defined by the claims.

Figure 1:
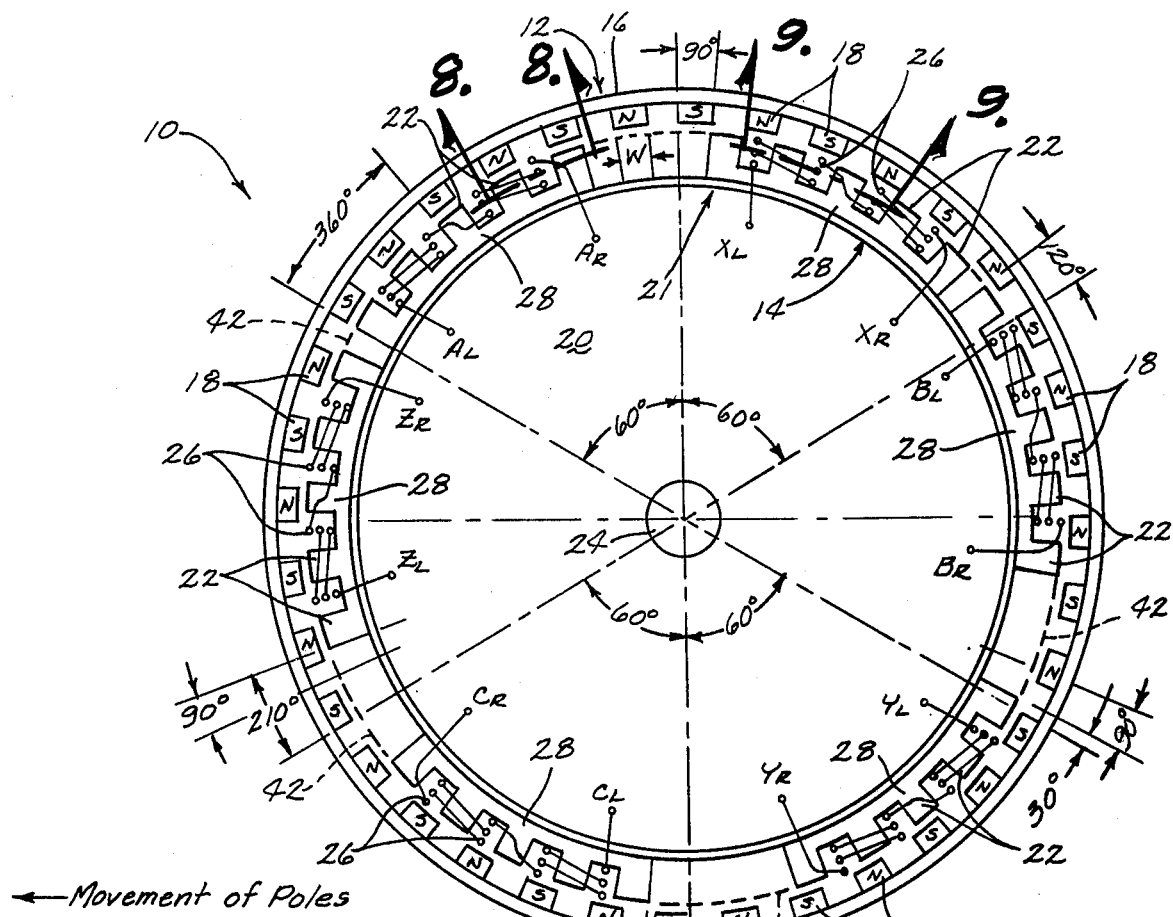
FIG. 1 is an elevational view of the rotor and stator configuration of the present invention.

The apparatus for minimizing magnetic cogging 10 of FIG. 1 includes a rotor 12 and a stator 14. Rotor 12 has an annular member 16 and an even number of magnetic poles 18 secured to the internal circumference of member 16. Stator 14 includes a disc-shaped member 20, an annular facing 21 secured to the periphery of 20, and a plurality of teeth 22 made of a magnetic material and secured to facing 21. Poles 18 are of width W which is equal to the spacing therebetween, and similarly teeth 22 are of width W and spaced a distance W from adjacent teeth. A distance 2W is equal to one pole pitch.

Strict uniform spacing between adjacent teeth or adjacent poles is not necessary, but it is highly desirable and substantially uniform spacing is needed. Uniform width of teeth and poles is desirable but not necessary. Further, it is desirable but not necessary to space adjacent teeth a distance equal to tooth width, and to space adjacent poles a distance equal to pole width. In the event the teeth or poles are spaced or shaped in these alternative ways, the definition of a pole pitch, i.e., the distance between the centers of adjacent poles, still applies. Note that for equal spacing and width W, this definition results in a pole pitch of 2W as indicated above.

The rotor 12 and stator 14 are supported within a housing (not shown). The stator and rotor have a common central axis 24 and rotor 12 is adapted to rotate about the axis. As is well known, if a generator is desired, axis 24 is merely rotated by a conventional fossil fuel motive means (not shown). Similarly, if a motor is desired, a current supply (not shown) is provided to energize the coils 26 of the stator by applying a periodic signal which will thereby rotate rotor 12.

Figure 2:
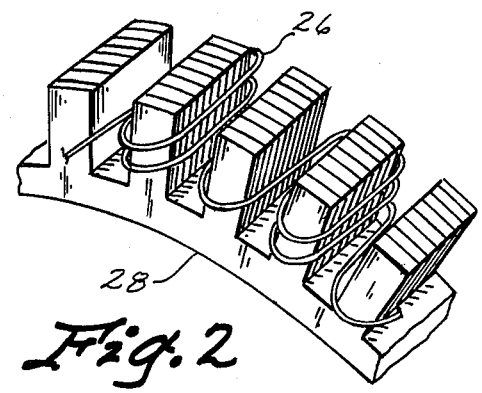
FIG. 2 is a perspective view of the teeth of one angular section of the stator of FIG. 1.

Stator 14 is divided into six equal pie-shaped angular sections A, B, C, X, Y and Z (FIG. 1). Each section includes a set 28 of five teeth 22 with coils 26 wound around the three central teeth of each set 28 (FIG. 2). In conventional fashion, when relative movement occurs between the rotor and stator, the magnetic flux lines between the poles 18 and teeth 22 are cut by the coils 26. Thus, an electromotive force is induced in the coils equal to the rate of change of the flux which passes through the area of the coil. If the rotor 12 is given a fixed angular velocity, a periodic electromotive force is induced. A current will flow in the coils equal to this induced electromotive force divided by the sum of the impedance of the coils and the load connected to the coils. Similarly, if a periodic current is generated in the coils 26, the rotor will turn with a fixed angular velocity due to the periodic variations in the magnetic field generated around the circumference of the stator 14. The ends of the respective windings for coils 26 are marked as left and right by L and R, respectively.

Figure 3:
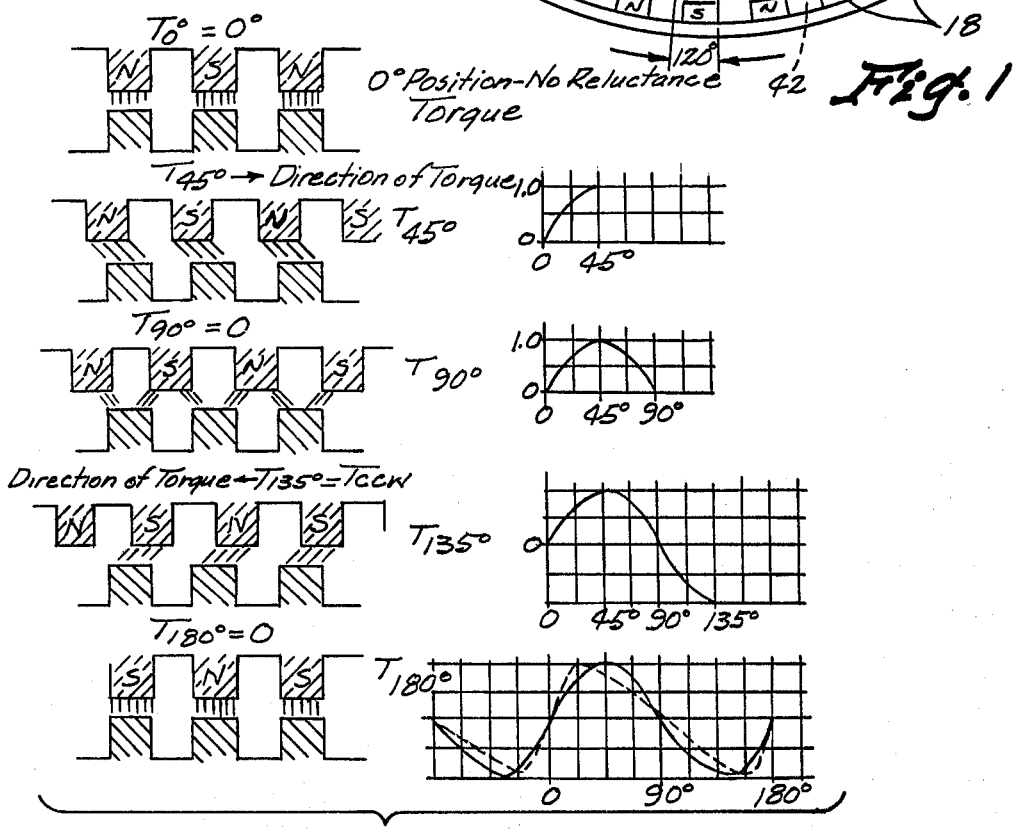
FIG. 3 is a partial enlarged view of the teeth and magnets in five selected positions, with corresponding graphs showing the reluctance torque in each of the positions.

FIG. 3 displays five positions of three teeth 22 of section A (coils 26 have been removed for clarity) and three corresponding poles 18 of rotor 12. The positions are given in degrees representing five steps of a complete "cycle" for a pole 18. The directon of rotation is right to left in FIG. 3, which represents counter-clockwise rotation in FIG. 1. At a fixed position of 0° the poles 18 are directly above a tooth 22. Due to symmetry, the poles above the teeth of Section A (i.e., at 0°) are thus in magnetic equilibrium. The reluctance torque or magnetic cogging is the magnetic force resisting the counter-clockwise rotation. At the *instant* the teeth are at 0°, there is no such resisting force. At a small time later (i.e., the 45° position), the poles are one-half of their width W displaced in the direction of rotation. The magnetic attraction of each pole is now predominantly towards the tooth which is still below one-half of the pole's width. This magnetic attraction tends to draw the poles opposite to the direction of rotation. The upper graph in FIG. 3 showing reluctance torque as a function of angular position, shows the rise of the reluctance torque from 0 at 0° to a peak at 45°. The peak value is arbitrarily designated as 1.0.

At a third position in the "cycle" (i.e., 90°), the poles 18 are displaced a distance W which puts them directly between two teeth 22. The poles 18 are thus equidistant from each of two teeth 22 and are therefore equally attracted. Thus, the cogging is again 0. The graph of the reluctance torque at 90° (i.e., $T_{90°}$) in FIG. 3, shows the drop of the cogging force from a peak at 45° to 0 at 90°.

At a fourth position (i.e., 135°), the poles 18 are one-half of their width over a tooth 22 again. This causes the predominant magnetic attraction between poles and teeth to assist the direction of rotation and the cogging becomes "negative", reaching a peak at −1.0 (as the graph $T_{135°}$ indicates).

At the final position (i.e., 180°), poles 18 are again directly above a tooth 22 and thus as at 0°, no opposition to the rotation of rotor 12 occurs at this *instant*. Graph $T_{180°}$ shows the complete 180° "cycle" as a solid line. The skewed dash line superimposed thereon, is a more accurate representation of the actual cogging force during the 180° "cycle". The skewing from a sinusoidal shape is due to magnetic circuit variations with position. Cogging force is tangential and varies as a function of the square of the magnetic field in the air gap between the teeth and poles, and the rate of change of reluctance with angular position.

Only 180° is used as a "cycle" because twice this distance (i.e., 350° or 4W) is two pole pitches which, as discussed further below, defines an electrical shift for adjacent teeth of 360°. The magnetic force repeats the shape of graph $T_{180°}$ every time a pole moves a distance 2W along the circular path defined by the rotor, thus for cogging purposes, a 180° electrical shift is a "cycle".

It is important to note that the magnetic cogging discussed above is independent of the magnetic field induced in coils 26 when a current is flowing therein. Whatever magnetic fields are generated due to the presence of the coil, the magnetic cogging effects remain and are solely a function of the relative position of the poles and the teeth as shown in FIG. 3.

Figure 4:
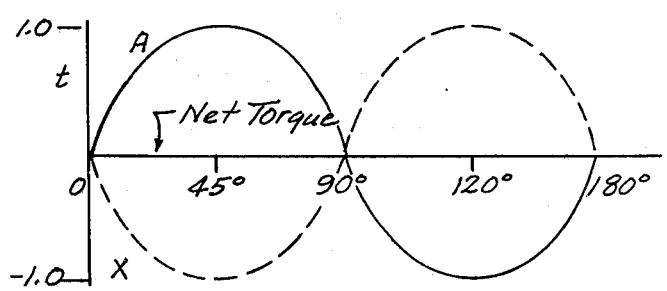
FIG. 4 is a graph of the reluctance torque of section A of FIG. 1 and section X of FIG. 1 as a function of the angular positions depicted in FIG. 3.

FIG. 4 depicts the reluctance torques of sections A and X separately as the poles 18 of rotor 12 pass through an arc 2W (i.e., 180°). The solid line in FIG. 4 is the torque of Section A, and the dashed line is the torque of Section X. The teeth 22 of section X are shifted one-half of one pole pitch (i.e., 90° or W) with respect to the teeth 22 of section A. Thus, the reluctance torque for Section X "leads" or "lags" the reluctance torque of Section A, depending on the direction of rotation, by 90°. When the reluctance torques for each section are superimposed on the same graph as in FIG. 4, it is apparent that they essentially cancel one another. This cancelling is not total due to the true skewed shape of the reluctance torque graphs, but the net reluctance torque between sections A and X is substantially reduced by shifting the teeth of Section X.

Similarly, the teeth 22 of Section Y are displaced 90° with respect to teeth 22 of Section B, and the teeth 22 of Section Z are displaced 90° with respect to the teeth 22 of Section C. The net reluctance torques between Sections B and Y, and between Sections C and Z are thus also essentially zero. Therefore, the total reluctance torque for electrical machine 10 is essentially zero.

Shifting sections X, Y and Z 90° in the embodiment of FIG. 1 will produce the optimum and preferred effect of virtually zero reluctance torque. However, shifting Sections X, Y and Z between 0° and 90° with respect to sections A, B and C, will also reduce cogging, but to a lesser degree. Such intermediate positioning is also possible with the alternative embodiments discussed below.

Additionally, the teeth of Section A are shifted 120° electrically (i.e., one-third of two pole pitches, or four-thirds W) with respect to the teeth 22 of Section B. Also, the teeth 22 of Section C are shifted 120° electrically with respect to the teeth 22 of both Sections A and B. Note that this will produce a 120° shift of the teeth 22 of Section X with respect to the teeth 22 of Section Y, and the teeth 22 of Section Z will be shifted 120° with respect to the teeth 22 of both Sections X and Y.

Thus, in an electric generator, when a fixed angular velocity is given to rotor 12, the periodic voltages induced across the coils 26 of Sections A and X, are 120° out of phase with respect to the voltages induced across the coils 26 of Sections B and Y, respectively. Also, the voltages induced across the coils 26 of Section C, are 120° out of phase with respect to the voltages induced across the coils 26 of both Sections A and B, and the voltages induced across Section Z are 120° out of phase with respect to both the voltages induced across Sections X and Y.

Figure 5:
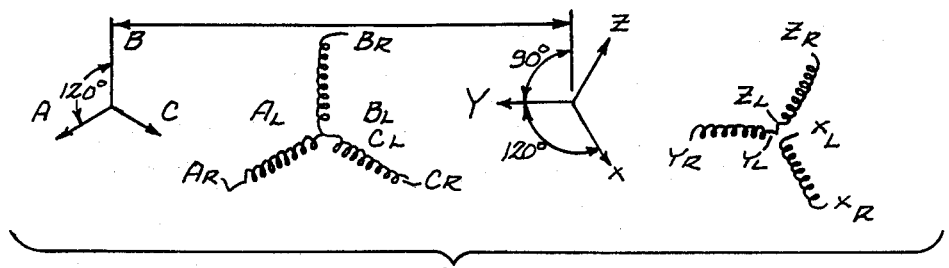
FIG. 5 is a phasor and connection diagram for the combinations of sections A, B and C, and X, Y and Z of FIG. 1.
Figure 6:
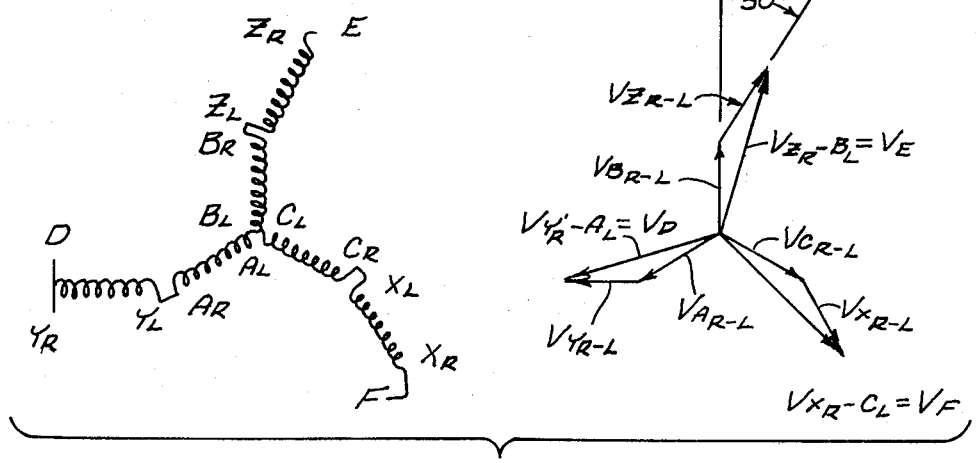
FIG. 6 is a phasor and connection diagram for all six sections of FIG. 1 for a balanced three-phase electrical generator.

FIG. 5 displays the induced voltages in the various sections as phasor diagrams (the length of the solid lines representing the magnitude of the induced voltages and the direction of the various phasors indicating the phase). FIG. 5 also shows corresponding connection diagrams for separate outputs from the six sections. If a balanced three-phase output is desired, FIG. 6 indicates the required connection diagrams and corresponding three phase output in a phasor diagram. In conventional fashion, the subscripts are used to indicate the particular voltages which are combined and to indicate the resultant three phase output, i.e., $V_D$, $V_E$ and $V_F$.

Additionally, the magnitude and phase of the output voltages from the device of FIG. 1 could be varied by connecting and tapping selected portions of the sections of FIG. 1. For example, one could tap a portion of the output of section X and connect the same to the main or a tapped portion of the output of Section A.

If a two, single phase machine is desired, one can eliminate the 120° electrical phase shift between Sections A, B and C, and eliminate the 120° electrical phase shift between Sections X, Y and Z. Sections A, B and C together would remain 90° out of electrical phase with the combination of Sections X, Y and Z. Thus, magnetic cogging is still minimized. It is further clear that the stator 14 can be divided into two equal sections in various ways, with a 90° phase shift between the two sections to minimize cogging.

Figure 7:
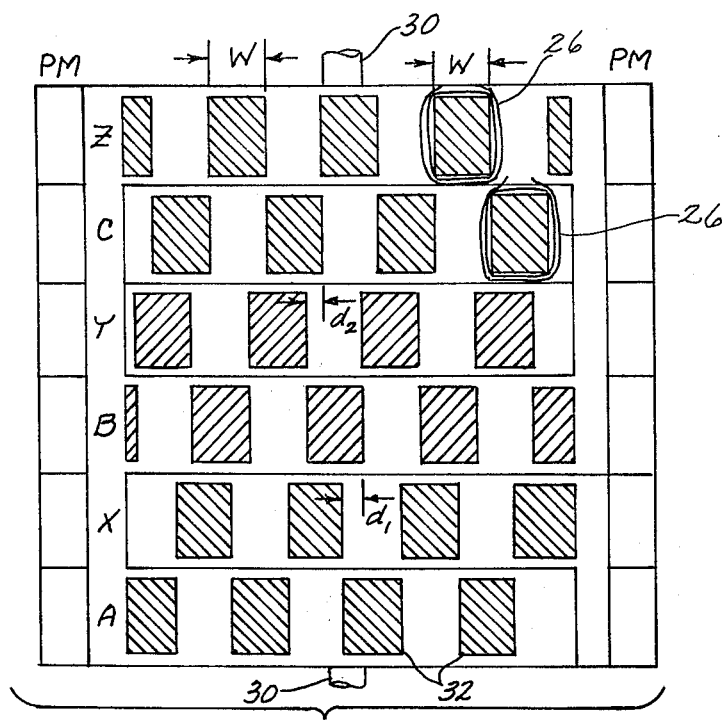
FIG. 7 is an alternate embodiment of the present invention displayed in an axial configuration.

FIG. 7 displays a schematic of an alternative embodiment of the present invention. Columns PM are the permanent pole magnets which are disposed around the internal circumference of six stacked annular rotors identical to rotor 12. Each rotor is associated with a separate stator. The stators are stacked and arranged as sections A, X, B, Y, C and Z. The entire assembly is centered around axis 30 with the six stacked rotors adapted to rotate about axis 30. Again, a conventional housing (not shown) would be afforded as well as a conventional current source or fossil fuel motive means depending on whether a motor or a generator is desired.

The cross-hatched faces 32 of each stator section of FIG. 7 represent the teeth 22. The teeth and poles are equally spaced a distance W, with pole and tooth width being W. The alternative spacing and width arrangements discussed with respect to the embodiment of FIG. 1, are applicable to FIG. 7, too.

Again, the teeth of sections X, Y and Z are displaced 90° (i.e., one-half pole pitch or W) with respect to the teeth 22 of Sections A, B and C, respectively. Further, the teeth of Sections A, B and C are displaced 120° (i.e., one-third of two pole pitches, or four-thirds W) with respect to the teeth of one another. Thus, in FIG. 7, $d_1$ equals $d_2$ which is equal to one-third W, and the teeth of Sections X, Y and Z are in registered relationship with the spaces of Sections A, B and C, respectively.

As with the device of FIG. 1, the embodiment of FIG. 7 is easily converted to a two, single phase machine. The outputs of Sections A, B and C can be combined and the electrical phase shift between these sections eliminated. When Sections X, Y and Z are likewise modified, the combination of X, Y and Z will be 90° electrically shifted from the combination of A, B and C, thereby minimizing cogging.

Figures 8, 9, 12:
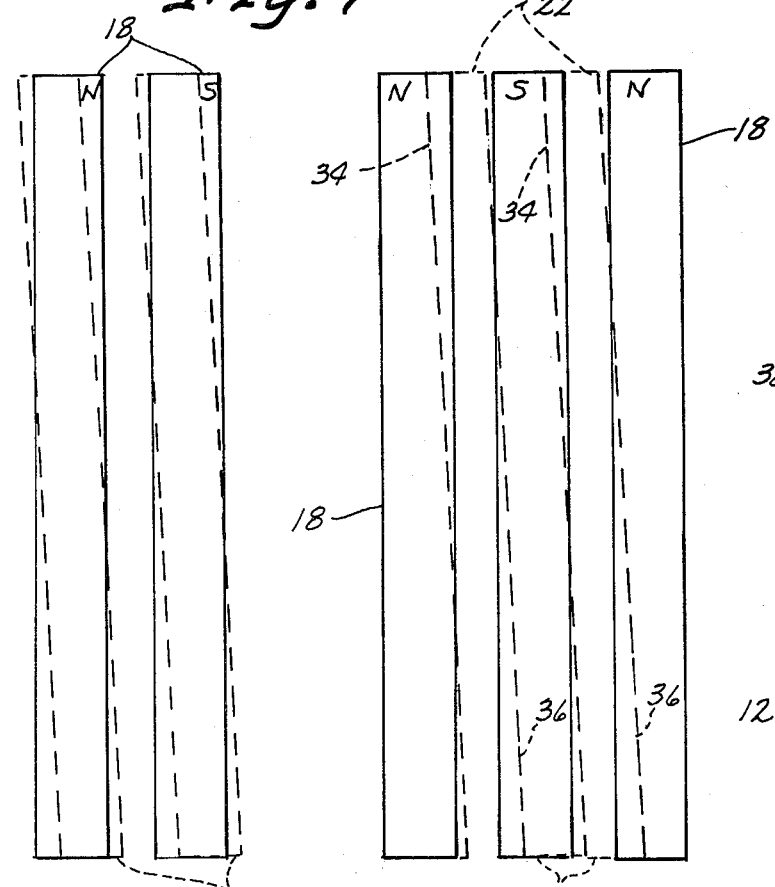
FIG. 8 is a partial sectional view along line 8—8 of FIG. 1 showing two teeth of section A of the stator as skewed and superimposed on the corresponding poles of the rotor with the windings omitted.
FIG. 9 is a partial sectional view along lines 9—9 of FIG. 1 showing two teeth of section X of the stator as skewed and superimposed on the corresponding poles of the rotor with the windings omitted.
FIG. 12 is a sectional view of the radial rotor and stator of FIGS. 10 and 11 positioned to function as a generator.

FIGS. 8 and 9 display an alternative position of the teeth of either of the stators of the first two embodiments. Instead of parallel alignment of the stator teeth 22 with the axis 24 (or 30) of the stator 14, the teeth may be skewed. Because the tooth width W is equal to the space between poles 18 (which alternate in polarity), when a tooth centered between poles 18 is skewed, equal portions of the tooth will lie above a north and south pole at the same time. This will reduce the skewing in the shape of the 180° "cycle" of the reluctance torques as displayed in FIG. 4. But, there is a corresponding reduction in the magnetic flux contributing to inducing an electromotive force. However, for small skewing (i.e., 10° or less), voltage outputs will not be substantially reduced yet cogging will be further reduced.

FIG. 8 shows two skewed teeth 22 of Section A centered above two poles 18 of rotor 12. FIG. 9 shows the corresponding skewed teeth of Section X which are now centered between poles 18 of rotor 12 due to the 90° shift with respect to the teeth 22 of Section A. Areas 34 and 36 of the skewed teeth 22 of Section X are seen to be equal and to lie over poles of opposite polarity.

Figure 10:
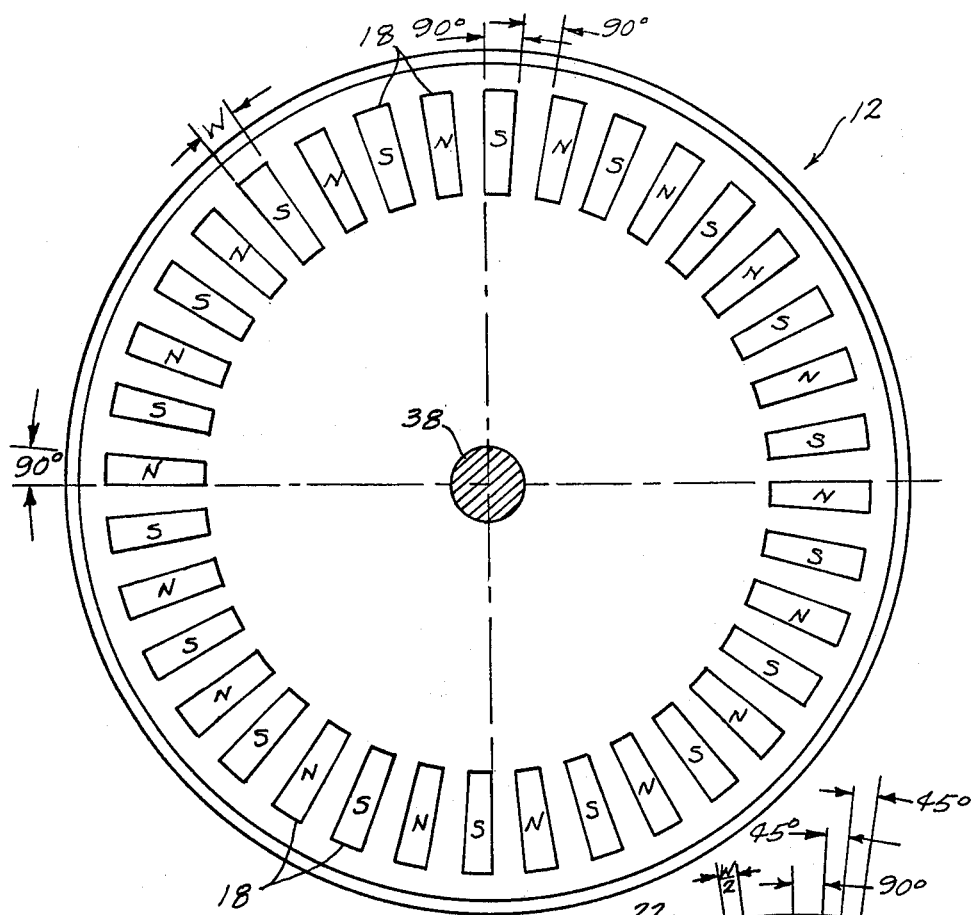
FIG. 10 is an elevational view of a radial configuration for the rotor.
Figure 11:
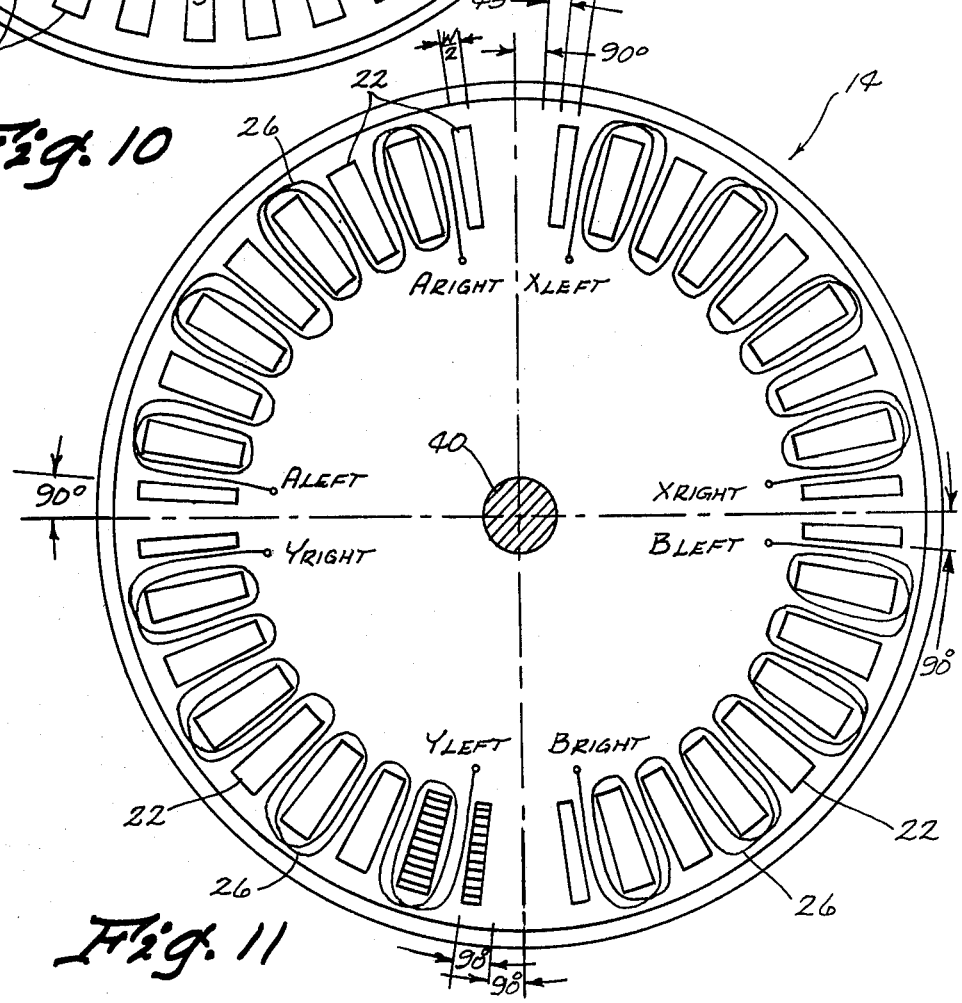
FIG. 11 is an elevational view of a radial configuration for a stator divided into four sections.

A third configuration of the present invention is presented in FIGS. 10, 11 and 12.

The magnetic poles 18 are now of radial configuration on rotor 12, i.e., poles 18 are wedge shaped and fan outwardly from central axis 38. Poles 18 are equally spaced but the spaces fan out to conform to the shape of the poles which terminate in an angular width W (FIG. 10). Similarly, the teeth 22 of stator 14 are of the same radial shape as poles 18 (FIG. 11). For illustrative purposes, stator 14 in FIG. 11 includes only four sections A, X, B and Y. The teeth 22 of Sections X and Y are displaced circumferentially one-half of one pole pitch (i.e., 90° or W, which is one-half of the angular distance between the center of adjacent poles) with respect to the teeth 22 of Sections A and B, respectively (FIG. 11). Thus again the magnetic cogging between A and X, and between B and Y, is minimized. Sections A and B are shown in phase, as are Sections X and Y; but, as discussed above, and as shown in FIG. 11, X could be shifted relative to A, and Y relative to B, to give two single phase circuits, X and Y, 90° electrically shifted from A and B (i.e., the essence of two phase operation) if desired multiphase output. Similarly, additional sections, shifted to minimize cogging and produce further output phases, could be added.

FIG. 12 shows the radial stator 14 of FIG. 11, and the radial rotor 12 of FIG. 10 positioned on a second axis 40 which is aligned along the longitudinal direction of axis 38. When rotor 12 is turned, an electromotive force will be induced in coils 26 of stator 14 as discussed above. Clearly, poles 18 could be stationary and the teeth 22 rotated to produce the same result.

It is also clear that a wedge shape is not the only pole or tooth shape suitable for a generator with a rotor and stator positioned as in FIG. 11.

It is obvious to one skilled in the art that a synchronous stepped motor could be constructed using the stator and rotor configurations of the present invention. For example, if a DC signal is input to Sections A, B and C, with the three sections receiving the signals at different times (i.e., synchronized), by use of an encoder or suitable timing device, and by use of a micro-processor to regulate the magnitude and direction of the currents, a quite uniform uni-directional torque will result from the motor action. The speed would also be regulated according to the frequency of the synthesized AC current described.

Further variations in the present invention including, but not limited to, modifications of the number of magnets, shape of the poles or teeth, number of sections and combinations of the electrical output, can be easily accomplished. The permanent magnetic poles 18 could, of course, be electromagnets. Stator 14 could be turned with rotor 12 held stationary since relative movement between the rotor and stator is the only requirement to produce an operational electrical machine. Also, the poles 18 need not strictly alternate in polarity as long as sufficient change in the magnetic flux remains to provide the relative rotational motion. However, it is clear that alternating polarity is highly desirable to the smooth running of an alternator or generator, and is definitely superior to the configurations. The teeth 22 and coils 26 could be placed on the internal circumference of rotor 12 with the poles 18 being disposed on the external circumference of stator 14.

Finally, the dashed lines 42 of FIG. 1 between teeth sections 28, represents a special form of the teeth 22. The arrangement of properly spaced teeth 22 can easily be formed from a single, annular piece of magnetic material. The spacing between teeth can be punched out. A programmed punch press means could enhance the process. The dashed lines 42 thus depict the outer circumference of the annular magnetic material from which the teeth are thus punched. The annular magnetic material can be made of laminated, sheet steel which includes a programmed position slot die.

Thus from the above description, it is seen that the disclosed invention accomplishes at least all of its stated objectives.

What is claimed is:

1. An apparatus for reducing magnetic cogging in an electrical motor comprising:

a plurality of magnetic poles, each having a defined pole pitch;

means to support said poles in at least two annular configurations wherein said poles are arranged with substantially alternate polarity within each annular configuration and the configurations overlie one another so that they have a common central axis, said annular configurations are identical rotatable rotors of even number with poles of the same polarity registered;

a magnetic flux carrier including a magnetic material disposed in spaced concentric relation within each of said annular configurations, and being supported by axial bearings to allow relative rotation between each carrier and respective annular configuration about said axis;

the angular position of the magnetic material and at least one flux carrier being displaced angularly relative to the magnetic material and at least one other flux carrier so that the magnetic cogging between the annular configurations surrounding the displaced flux carrier and the magnetic material of the displaced flux carrier, is opposed by the magnetic cogging between the annular configuration surrounding the non-displaced flux carrier and the magnetic material of the non-displaced flux carrier, said flux carriers are cylindrical, each flux carrier having an equal number of teeth each having a defined tooth pitch and being shaped from the magnetic material and regularly spaced around the external circumference of the cylinder and wherein the flux carriers are paired, with the first member of each pair being angularly displaced relative to the second member of each pair so that the teeth of each first member are registered with the space between the teeth of the second member of the same pair, with the angular distance between the centers of adjacent poles being one pole pitch, and wherein there are three pairs of flux carriers and the first member of each pair is angularly displaced through a distance equal to one-third of two pole pitches with respect to the first member of all other pairs, and the second member of each pair is displaced through a distance equal to one-half of one pole pitch with respect to the first member of the same pair;

the magnetic material of the flux carriers is shaped to receive coils so that if a variable current signal is established in the coils said relative rotation will occur;

the ratio of the span of each of said tooth pitch and to said pole pitch being about 1:1.

2. An apparatus for reducing magnetic cogging in an electrical motor comprising:

a plurality of magnetic poles each having a defined pole pitch arranged with substantially alternate polarity in an annular configuration having a central axis, said poles being of equal width and equally spaced;

means for supporting said poles, comprising an annular rotor and said magnetic poles are secured to the internal circumference of said rotor and said rotor is supported by axial bearings to rotate about the central axis;

a magnetic flux carrier including a magnetic material disclosed within said annular configuration and spaced, concentric relation to said poles and supported by axial bearings to allow relative rotation of said carrier and poles about said axis, said flux carrier remaining stationary;

said magnetic material being divided into three pairs of sections wherein the members of each pair are of equal angular dimensions and wherein said magnetic material is secured to the outer circumference of each section and is formed into teeth, each having a defined tooth pitch, said teeth being of equal width and equally spaced and parallelly disposed to the central axis in the longitudinal direction thereof, and wherein a first member of each of the three pairs of sections is displaced angularly 120° electrically from a first member of every other pair and wherein the second member of each pair is displaced angularly 90° electrically with respect to the first member of the same pair so that magnetic cogging between the poles and the first member of each pair opposes magnetic cogging between the poles and the second member of each pair; and said magnetic material being shaped to receive coils so that if a variable current signal is established in the coils said relative rotation will occur;

the ratio of the span of each of said tooth pitch to said pole pitch being about 1:1.

3. The apparatus of claim 2 wherein the poles are of equal width and equally spaced, the flux carrier is cylindrical and divided into the three pairs of sections wherein the members of each pair are of equal angular dimensions, and wherein said magnetic material is secured to the outer circumference of each section and is formed into teeth of equal width and equal spacing with one pole pitch being the angular distance between the centers of adjacent magnetic poles, and wherein the first member of each of the three pairs of sections is displaced angularly by one-third of two pole pitches relative to the first member of every other pair, and wherein the second member of each pair is displaced angularly one-half of one pole pitch with respect to the first member of the same pair.

4. The apparatus of claim 2 wherein the teeth are disposed at an angle with respect to the longitudinal direction of the central axis so that when a tooth is centered in a space between poles, equal portions of the surface area of said tooth will overlap the surface area of each of the adjacent poles.

5. The apparatus of claim 2 wherein each section has a set of coils having electrical connections allowing them to be electrically separated.

6. The apparatus of claim 3 wherein each section has a set of coils having electrical connections allowing them to be electrically separated.

7. The apparatus of claim 2 wherein the spacing between the teeth equals the width of the teeth, the width of the poles and the spacing between poles.

8. The apparatus of claim 3 wherein the spacing between the teeth equals the width of the teeth, the width of the poles and the spacing between poles.

9. An apparatus for reducing magnetic cogging in an electrical generator comprising:

a plurality of magnetic poles each having a defined pole pitch arranged with substantially alternate polarity in an annular configuration having a central axis, said poles being of equal width and equally spaced;

means for supporting said poles, comprising an annular rotor and said magnetic poles are secured to the internal circumference of said rotor and said rotor is supported by axial bearings to rotate about the central axis;

a magnetic flux carrier including a magnetic material disclosed within said annular configuration and spaced, concentric relation to said poles and supported by axial bearings to allow relative rotation of said carrier and poles about said axis, said flux carrier remaining stationary;

said magnetic material being divided into three pairs of sections wherein the members of each pair are of equal angular dimensions and wherein said magnetic material is secured to the outer circumference of each section and is formed into teeth each having a defined tooth pitch, said teeth being of equal width and equally spaced and parallelly disposed to the central axis in the longitudinal direction thereof, and wherein a first member of each of the three pairs of sections is displaced by angularly 120° electrically from a first member of every other pair and wherein the second member of each pair is displaced angularly 90° electrically with respect to the first member of the same pair so that magnetic cogging between the poles and the first member of each pair opposes magnetic cogging between the poles and the second member of each pair;

said magnetic material being shaped to receive coils so that voltages may be induced in the coils when relative rotation about said axis occurs between the flux carrier and the poles;

the ratio of the span of each of said tooth pitch to said pole pitch being about 1:1.

10. The apparatus of claim 9 wherein the poles are of equal width and equally spaced, the flux carrier is cylindrical and divided into the three pairs of sections wherein the members of each pair are of equal angular dimensions, and wherein said magnetic material is secured to the outer circumference of each section and is formed into teeth of equal width and equal spacing with one pole pitch being the angular distance between the centers of adjacent magnetic poles, and wherein the first member of each of the three pairs of sections is displaced angularly by one-third of two pole pitches relative to the first member of every other pair, and wherein the second member of each pair is displaced angularly one-half of one full pitch with respect to the first member of the same pair.

11. The apparatus of claim 9 wherein the teeth are disposed at an angle with respect to the longitudinal direction of the central axis so that when a tooth is centered in a space between poles, equal portions of the surface area of said tooth will overlap the surface area of each of the adjacent poles.

12. The apparatus of claim 9 wherein each section has a set of coils having electrical connections allowing them to be electrically separated.

13. The apparatus of claim 10 wherein each section has a set of coils having electrical connections allowing them to be electrically separated.

14. The apparatus of claim 12 wherein when a voltage is induced in the first member of each pair when relative rotation occurs between the magnetic poles and the flux carrier, the voltage induced across the coils of the first member of each pair is combined with the voltage induced across the coils of one and only one unique second member of another pair, so that the generator produces a three-phase output.

15. The apparatus of claim 13 wherein when a voltage is induced in the first member of each pair when relative rotation occurs between the magnetic poles and the flux carrier, the voltage induced across the coils of the first member of each pair is combined with the voltage induced across the coils of one and only one unique second member of another pair, so that the generator produces a three-phase output.

16. The apparatus of claim 9 wherein the spacing between the teeth equals the width of the teeth, the width of the poles and the spacing between poles.

17. The apparatus of claim 10 wherein the spacing between the teeth equals the width of the teeth, the width of the poles and the spacing between poles.

18. An apparatus for reducing magnetic cogging in an electrical generator comprising:
a plurality of magnetic poles, each having a defined pole pitch;
means to support said poles in at least two annular configurations wherein said poles are arranged with substantially alternate polarity within each annular configuration and the configurations overlie one another so that they have a common central axis, said annular configurations are identical rotatable rotors of even number with poles of the same polarity registered;
a magnetic flux carrier including a magnetic material disposed in spaced concentric relation within each of said annular configurations, and being supported by axial bearings to allow relative rotation between each carrier and respective annular configuration about said axis;
the angular position of the magnetic material and at least one flux carrier being displaced angularly relative to the magnetic material and at least one other flux carrier so that the magnetic cogging between the annular configuration surrounding the displaced flux carrier and the magnetic material of the displaced flux carrier is opposed by the magnetic cogging between the annular configuration surrounding the non-displaced flux carrier and the magnetic material of the non-displaced flux carrier, said flux carriers are cyindrical, each flux carrier having an equal number of teeth each having a defined tooth pitch and shaped from the magnetic material and regularly spaced around the external circumference of the cylinder and wherein the flux carriers are paired, with the first member of each pair being angularly displaced relative to the second member of each pair so that the teeth of each first member are registered with the spaces between the teeth of the second member of the same pair, the width of the spaces between teeth are equal to the width of the space between poles, with the angular distance between the centers of adjacent poles being one pole pitch, and wherein there are three pairs of flux carriers and the first member of each pair is angularly displaced through a distance equal to one-third of two pole pitches with respect to the first member of all other pairs, and the second member of each pair is displaced through a distance equal to one-half of one pole pitch with respect to the first member of the same pair;
the magnetic material of the flux carriers is shaped to receive coils so that when relative rotation occurs between the poles and the magnetic material about the central axis, a voltage is induced in the coils;
the ratio of the span of each of said tooth pitch to said pole pitch being about 1:1.

19. The apparatus of claim 18 with only one pair of sections, one section displaced from the other 90° electrically, so that if an appropriate variable current signal is established in the coils, said relative rotation will occur.

20. The apparatus of claim 18 but with only one pair of sections, one displaced from the other 90° electrically so that when relative motion occurs between the poles and the magnetic material about the center axis, a voltage is induced in the coils.

21. The apparatus of claim 2 wherein operation of the apparatus is the same regardless of whether said magnetic poles rotate with respect to stationary magnetic material or whether magnetic material rotates with respect to stationary magnetic poles.

22. The apparatus of claim 2 wherein said magnetic poles and said magnetic material can comprise either permanent magnets or energized electro-magnets.

23. The apparatus of claim 1 wherein operation of the apparatus is the same regardless of whether said magnetic poles rotate with respect to stationary magnetic material or whether magnetic material rotates with respect to stationary magnetic poles.

24. The apparatus of claim 1 wherein said magnetic poles and said magnetic material can comprise either permanent magnets or energized electro-magnets.

25. The apparatus of claim 9 wherein operation of the apparatus is the same regardless of whether said magnetic poles rotate with respect to stationary magnetic material or whether magnetic material rotates with respect to stationary magnetic poles.

26. The apparatus of claim 9 wherein said magnetic poles and said magnetic material can comprise either permanent magnets or energized electro-magnets.

27. The apparatus of claim 18 wherein operation of the apparatus is the same regardless of whether said magnetic poles rotate with respect to stationary magnetic material or whether magnetic material rotates with respect to stationary magnetic poles.

28. The apparatus of claim 18 wherein said magnetic poles and said magnetic material can comprise either permanent magnets or energized electro-magnets.

29. An apparatus for reducing magnetic cogging in an electrical motor comprising:
a plurality of magnetic poles each having a defined pole pitch arranged with substantially alternate polarity in an annular configuration having a central axis, said poles being of equal width and equally spaced;
means for supporting said poles, comprising an annular rotor and said magnetic poles are secured to the internal circumference of said rotor and said rotor is supported by axial bearings to rotate about the central axis;
a magnetic flux carrier including a magnetic material disclosed within said annular configuration and spaced, concentric relation to said poles and supported by axial bearings to allow relative rotation of said carrier and poles about said axis, said flux carrier remaining stationary;
said magnetic material being divided into a plurality of n pairs of sections wherein the members of each pair are of equal angular dimensions and wherein said magnetic material is secured to the outer circumference of each section and is formed into teeth, each having a defined tooth pitch, said teeth being of equal width and equally spaced and parallelly disposed to the central axis in the longitudinal direction thereof, and wherein a first member of each of the pairs of sections is displaced angularly $(360/n)°$ electrically from a first member of every other pair and wherein the second member of each pair is displaced angularly 90° electrically with respect to the first member of the same pair so that magnetic cogging between the poles and the first member of each pair opposes magnetic cogging between the poles and the second member of each pair; and said magnetic material being shaped to receive coils so that if a variable current signal is established in the coils, said relative rotation will occur;

the ratio of the span of each of said tooth pitch to said pole pitch being about 1:1.

30. An apparatus for reducing magnetic cogging in an electrical motor comprising:

a plurality of magnetic poles, each having a defined pole pitch;

means to support said poles in at least two annular configurations wherein said poles are arranged with substantially alternate polarity within each annular configuration and the configurations overlie one another so that they have a common central axis, said annular configurations are identical rotatable rotors of even number with poles of the same polarity registered;

a magnetic flux carrier including a magnetic material disposed in spaced concentric relation within each of said annular configurations, and being supported by axial bearings to allow relative rotation between each carrier and respective annular configuration about said axis;

the angular position of the magnetic material and at least one flux carrier being displaced angularly relative to the magnetic material and at least one other flux carrier so that the magnetic cogging between the annular configurations surrounding the non-displaced flux carrier and the magnetic material of the displaced flux carrier is opposed of the magnetic cogging between the annular configuration surrounding the non-displaced flux carrier and the magnetic material of the non-displaced flux carrier, said flux carriers are cylindrical, each flux carrier having an equal number of teeth each having a defined tooth pitch and being shaped from the magnetic material and regularly spaced around the external circumference of the cylinder and wherein the flux carriers are paired, with the first member of each pair being angularly displaced relative to the second member of each pair so that the teeth of each first member are registered with the space between the teeth of the second member of the same pair, with the angular distance between the centers of adjacent poles being one pole pitch, and wherein there are a plurality of pairs of flux carriers and the first member of each pair is angularly displaced through a distance equal to one-third of two pole pitches with respect to the first member of all other pairs, and the second member of each pair is displaced through a distance equal to one-half of one pole pitch with respect to the first member of the same pair;

the magnetic material of the flux carriers is shaped to receive coils so that if a variable current signal is established in the coils said relative rotation will occur;

the ratio of the span of each of said tooth pitch and to said pole pitch being about 1:1.

31. An apparatus for reducing magnetic cogging in an electrical generator comprising:

a plurality of magnetic poles each having a defined pole pitch arranged with substantially alternate polarity in an annular configuration having a central axis, said poles being of equal width and equally spaced;

means for supporting said poles, comprising an annular rotor and said magnetic poles are secured to the internal circumference of said rotor and said rotor is supported by axial bearings to rotate about the central axis;

a magnetic flux carrier including a magnetic material disclosed within said annular configuration and spaced, concentric relation to said poles and supported by axial bearings to allow relative rotation of said carrier and poles about said axis, said flux carrier remaining stationary;

said magnetic material being divided into a plurality of n paris of sections wherein the members of each pair are of equal angular dimensions and wherein said magnetic material is secured to the outer circumference of each section and is formed into teeth, each having a defined tooth pitch, said teeth being of equal width and equally spaced and parallelly disposed to the central axis in the longitudinal direction thereof, and wherein a first member of each of the pairs of sections is displaced angularly $(360/n)°$ electrically from a first member of every other pair and wherein the second member of each pair is displaced angularly 90° electrically with respect to the first member of the same pair so that magnetic cogging between the poles and the first member of each pair opposes magnetic cogging between the poles and the second member of each pair;

main magnetic material being shaped to receive coils so that voltages may be induced in the coils when relative rotation about said axis occurs between the flux carrier and the poles;

the ratio of the span of each of said tooth pitch to said pole pitch being about 1:1.

32. An apparatus for reducing magnetic cogging in an electrical generator comprising:

a plurality of magnetic poles, each having a defined pole pitch;

means to support said poles in at least two annular configurations wherein said poles are arranged with substantially alternate polarity within each annular configuration and the configurations overlie one another so that they have a common central axis, said annular configurations are identical rotatable rotors of even number with poles of the same polarity registered;

a magnetic flux carrier including a magnetic material disposed in spaced concentric relation within each of said annular configurations, and being supported by axial bearings to allow relative rotation between each carrier and respective annular configuration about said axis;

the angular position of the magnetic material and at least one flux carrier being displaced angularly relative to the magnetic material and at least one other flux carrier so that the magnetic cogging between the annular configuration surrounding the displaced flux carrier and the magnetic material of the displaced flux carrier, is opposed by the magnetic cogging between the annular configuration surrounding the non-displaced flux carrier and the magnetic material of the non-displaced flux carrier, said flux carriers are cylindrical, each flux carrier having an equal number of teeth each having a defined tooth pitch and shaped from the magnetic material and regularly spaced around the external circumference of the cylinder and wherein the flux carriers are paired, with the first member of each pair being angularly displaced relative to the second member of each pair so that the teeth of each first member are registered with the spaces between the teeth of the second member of the same pair, with the angular distance between the centers of adjacent poles being one pole pitch, and wherein there are a plurality of pairs of flux carriers and the first member of each pair is angularly displaced through a distance equal to one-third of two pole pitches with respect to the first member of all other pairs, and the second member of each pair is displaced through a distance equal to one-half of one pole pitch with respect to the first member of the same pair;

the magnetic material of the flux carriers is shaped to receive coils so that when relative rotation occurs between the poles and the magnetic material about the central axis, a voltage is induced in the coils;

the ratio of the span of each of said tooth pitch to said pole pitch being about 1:1.

33. An apparatus for reducing magnetic cogging in an electrical motor comprising:

a plurality of magnetic poles, each having a defined pole pitch, arranged substantially with alternate polarity in an annular configuration having a central axis wherein all the poles face along the longitudinal direction of said axis in the same direction;

means for supporting said poles;

a magnetic flux carrier including a magnetic material disposed in an annular configuration about said axis and being of substantially the same radius as the annular configuration of poles, and being supported by axial bearings to allow relative rotation between said carrier poles about said axis;

said magnetic material being positioned in spaced relation to and facing said poles and being divided into at least two sections wherein at least one section is displaced circumferentially relative to the non-displaced sections a half of one pole pitch, so that magnetic cogging between the poles and the displaced sections opposes magnetic cogging between the poles and the non-displaced sections;

said magnetic material being formed into teeth each having a defined tooth pitch and being shaped to receive coils so that if a variable current signal is established in the coils, said relative rotation will occur;

said magnetic material being divided into a plurality of n pairs of sections wherein the members of each pair are of equal angular dimensions and wherein said magnetic material is secured to the outer circumference of each section and is formed into teeth each having a defined tooth pitch, said teeth being of equal width and equally spaced and parallelly disposed to the central axis in the longitudinal direction thereof, and wherein a first member of each of the pairs of sections is displaced angularly $(360/n)°$ electrically from a first member of every other pair and wherein the second member of each pair is displaced angularly 90° electrically with respect to the first member of the same pair so that magnetic cogging between the poles and the first member of each pair opposes magnetic cogging between the poles and the second member of each pair; and the ratio of the span of each of said tooth pitch to said pole pitch being about 1:1.

34. An apparatus for reducing magnetic cogging in a generator comprising:

a plurality of magnetic poles, each having a defined pole pitch, arranged substantially with alternate polarity in a circular configuration having a central axis wherein all the poles face along the longitudinal direction of said axis in the same direction;

means for supporting said poles;

a magnetic flux carrier including a magnetic material disposed in a circular configuration about said axis and being of substantially the same radius as the circular configuration of poles, and being supported by axial bearings to allow relative rotation between said carrier poles about said axis;

said magnetic material being positioned in spaced relation to and facing said poles and being divided into at least two sections wherein at least one section is displaced circumferentially relative to the non-displaced sections so that magnetic cogging between the poles and the displaced sections opposes magnetic cogging between the poles and the non-displaced sections;

said magnetic material being formed into teeth each having a defined tooth pitch and being shaped to receive coils so that when relative rotation occurs between the poles and the magnetic material about the axis, a voltage is induced in the coils;

said magnetic material being divided into a plurality of n pairs of sections wherein the members of each pair are of equal angular dimensions and wherein said magnetic material is secured to the outer circumference of each section and is formed into teeth each having a defined tooth pitch, said teeth being of equal width and equally spaced and parallelly disposed to the central axis in the longitudinal direction thereof, and wherein a first member of each of the pairs of sections is displaced angularly $(360/n)°$ electrically from a first member of every other pair and wherein the second member of each pair is 5displaced angularly 90° electrically with respect to the first member of the same pair so that magnetic cogging between the poles and the first member of each pair opposes magnetic cogging between the poles and the second member of each pair; and the ratio of the span of each of said tooth pitch to said pole pitch being about 1:1.

35. The apparatus of claim 2 with only one pair of sections, one section displaced from the other 90° electrically, so that if an appropriate variable current signal is established in the coils, said relative rotation will occur.

36. The apparatus of claim 1 but with only one pair of sections, one displaced from the other 90° electrically so that when relative motion occurs between the poles and the magnetic material about the center axis, a voltage is induced in the coils.

37. The apparatus of claim 1 with only one pair of sections, one section displaced from the other 90° electrically, so that if an appropriate variable current signal is established in the coils, said relative rotation will occur.

38. The apparatus of claim 18 but with only one pair of sections, one displaced from the other 90° electrically so that when relative motion occurs between the poles and the magnetic material about the center axis, a voltage is induced in the coils.

* * * * *